United States Patent [19]

Lehman

[11] 4,334,767
[45] Jun. 15, 1982

[54] FLASH EXPOSURE SYSTEM
[75] Inventor: Richard F. Lehman, Fairport, N.Y.
[73] Assignee: Xerox Corporation, Stamford, Conn.
[21] Appl. No.: 53,603
[22] Filed: Jun. 29, 1979
[51] Int. Cl.³ .......................................... G03B 27/80
[52] U.S. Cl. ................................................... 355/68
[58] Field of Search ...................... 355/68, 67, 69–71, 355/35–38

[56] References Cited

U.S. PATENT DOCUMENTS

| | | | |
|---|---|---|---|
| 3,177,764 | 4/1965 | Akima | 355/68 X |
| 3,398,635 | 8/1968 | De Boer | 355/68 |
| 3,649,118 | 3/1972 | Yano et al. | 355/68 X |
| 3,734,630 | 5/1973 | McIntosh et al. | 355/68 X |
| 3,947,117 | 3/1976 | Basu et al. | 355/68 |
| 4,017,180 | 4/1977 | Yen et al. | 355/68 |

FOREIGN PATENT DOCUMENTS 700209 11/1940 Fed. Rep. of Germany ........ 355/68

*Primary Examiner*—L. T. Hix
*Assistant Examiner*—W. J. Brady

[57] ABSTRACT

An automatic exposure control system for a document copying machine is provided which includes a flash illumination system, a light intensity sensor positioned to directly view the document to be copied, and an illumination control means operatively associated with the sensor to control the mount of energy supplied to the illumination system in response to the energy of the sensed reflected light from the document.

3 Claims, 5 Drawing Figures

FLASH EXPOSURE SYSTEM

BACKGROUND OF THE INVENTION

The present invention relates to an automatic exposure control system for a document copying machine. More particularly, the invention relates to an exposure control system for use with a full-frame flash illumination system, which automatically compensates for the density of the background in the document to be copied.

As demands for faster copying and duplicating have increased, conventional machines which scan documents in incremental fashion to provide a flowing image on a xerographic drum have proved inadequate. New high speed techniques have evolved which utilize flash exposure of an entire document (full-frame) and the arrangement of a moving photoconductor in a flat condition at the instant of exposure. One such full-frame flash illumination system utilizing a diffuse integrating optical cavity is disclosed in copending Application of John A. Durbin and James D. Reese, Ser. No. 015,558, now U.S. Pat. No. 4,250,538, filed Feb. 26, 1979, which application is commonly assigned to the assignee of the present application. The disclosure of said application Ser. No. 015,558, now U.S. Pat. No. 4,250,538 is incorporated by reference in its entirety.

PRIOR ART STATEMENT

It is known in the prior art to control the exposure in a copying machine by using a light intensity detector to sense the amount of light reflected from an original document to be copied in a prescan period. See, Basu et al. U.S. Pat. No. 3,947,117. However, in the invention of Basu et al, the detection of the amount of light that is reflected from the original document, which when compared with a reference determines the amount of illumination the system will provide, takes place in a relatively long prescan period of, say, 0.2 second. That is a relatively long period of time since typically in a flash illumination system, the entire flash period takes place in about 500 micro seconds (0.5 millisecond) or less. The system of Basu et al is not suited for the control of the amount of exposure in a flash exposure system since the flash period is so short that scanning the original document for a maximum reflected illumination is not practicable. Moreover, the flash exposure technique was developed to provide faster copying speed, and the addition of a prescan period to a flash exposure system would work against that objective. Accordingly, there is a need for an improved exposure control system which is particularly adapted to a flash exposure system.

SUMMARY OF THE INVENTION

It is an object of the present invention to provide an improved exposure control system which is useful in a high speed document copying machine having a flash illumination system. It is another object of the present invention to provide an automatic exposure control system which takes into account the average background density of the document to be copied. These and other objects of the invention will be apparent from the following disclosure.

In accordance with the present invention, an automatic exposure control system for a document copying machine is provided which includes a flash illumination system, a light intensity sensor positioned to be directly visible to the document to be copied and capable of detecting the intensity of reflected light from the document during the illumination period, and an illumination control means operatively associated with the sensor to control the amount of energy supplied to the illumination system in response to the integral of the intensity of the sensed reflected light.

DETAILED DESCRIPTION

As indicated above, the demand for higher speed copying has led to the use of flash exposure of an entire document in place of the scanning optical and exposure systems which have been used in various copying machines. Typically, the flash exposure takes place in a much shorter period of time as compared to an exposure system using a scanning device. Given the amount of light needed to make a copy in a particular copying machine, it can be readily seen that the intensity of illumination in a flash exposure system must be greater to compensate for the shorter period of illumination as compared to a scanning system. To increase the efficiency of a flash exposure system and to reduce the amount of light lost through absorption by the exposure system housing or through leakage, the Durbin et al application Ser. No. 015,558 proposes the use of a diffuse integrating optical cavity as the housing for the flash exposure system. Since such a housing is the preferred environment in which the present invention may be utilized, the following description will show the exposure control device of the present invention in such a housing, but it is to be understood that the device of the present invention may also be used with other types of flash exposure housing.

Figure 1:
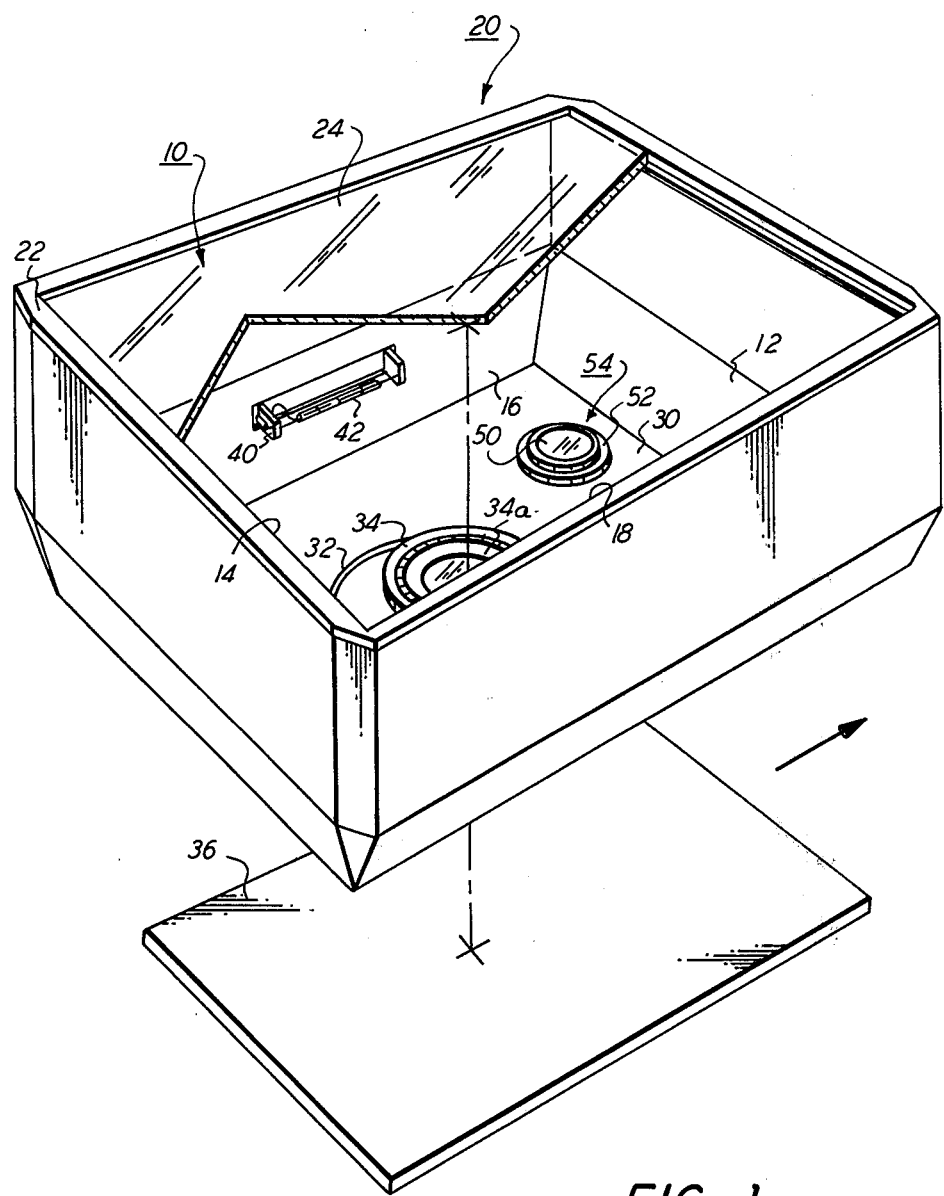
FIG. 1 is a perspective view of the illumination housing of a preferred embodiment of the present invention, showing the environment in which the invention is intended.
Figure 2:
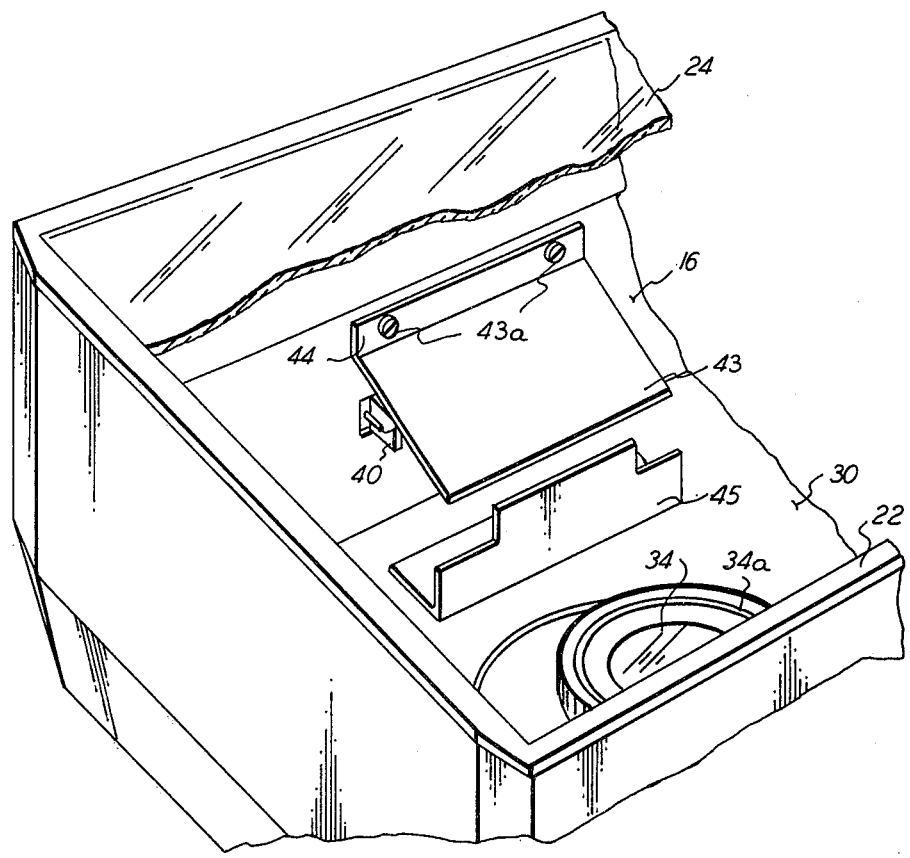
FIG. 2 is a more detailed view of the illumination housing of FIG. 1.

Referring now to FIGS. 1 and 2, there is shown one embodiment of an integrating optical cavity containing a flash exposure lamp, a lens housing, and a housing for a light intensity sensing means.

A completely enclosed housing 10, generally rectangular in shape, has a first pair of opposing side walls 12,14 and a second pair of opposing side walls 16,18. An upper, or top wall 20 includes a rectangular aperture 22 which, at the center thereof, accommodates a glass platen 24 forming the object plane. The platen may have a hinged cover (not shown) which may be pivoted upward to permit open platen copying of materials such as books.

The lower, or bottom, wall 30 has an aperture 32 therein which accommodates a circular lens housing 34. An image plane 36 which may be, for example, a photoconductive sheet to which a charge has been applied is positioned for exposure to light reflected from a document platen 24 and transmitted by lens 34. The projected light image selectively discharges the photoconductive sheet resulting in formation of a latent electrostatic image thereon.

Mounted in the lower half of side wall 16 by bracket 40 is flash illumination source 42, which is of relatively short length compared to the platen length in the same direction. Source 42 in a preferred embodiment is a lamp consisting of an envelope containing Xenon gas and a pair of electrodes at each end which are not electrically connected to each other. The lamp is connected to pulsing triggering circuitry (not shown) which may consist of a DC power supply connected across a storage capacitor which in turn is connected to the flash lamp through an inductor. When the pulsing circuit is activated, the lamp undergoes a gas breakdown resulting in a flash of appropriate duration. In operation, the lamp is periodically energized in timed relation to the movement of image plane 36 past the lens.

The interior walls of the cavity (12, 14, 16, 18, and 30) have substantially diffuse reflecting surfaces resulting from coating the interior wall surfaces with a high reflectivity (90%) material.

Barrel 34a of lens housing 34 is similarly coated. The surfaces of the platen may be coated, if desired with an anti-reflection material such as $M_gF_2$ or multi-layer anti-reflective material. As is well known in the art, this material will prevent any platen-derived specular reflection from entering the lens.

As shown in FIG. 2, a first blocker element 43 is mounted above lamp 42 and secured to wall 16 by screws 43a fastened through end portion 44. Blocker 43 projects at a slight downward angle relative to wall 16 and is of sufficient width and length to prevent direct light from lamp 42 from being viewed from any portion of platen 24. The top and bottom surfaces of blocker 43 may be coated with the same diffusely reflective material as that applied to the cavity interior.

A second thin blocker element 45 is secured to bottom wall 30 and projects upwardly and laterally a sufficient distance to prevent direct light from lamp 42 from reaching lens 34. Element 45 is of generally rectangular shape except for the omission of the upper corners.

The surfaces of blocker 45 may be coated with the same reflecting material which comprises the coating for the internal cavity walls.

Referring again to FIG. 2, an efficient flash illumination system is realized when utilizing a Xenon lamp. The lamp, as shown is mounted approximately ⅓ the height of wall 16 but other locations are possible dependent upon system requirements (so long as the lamp remains outside of the lens field of view). As a practical matter, the closer the lamp is mounted to the top surface of the housing the more difficult it becomes to provide uniform illumination at the surface of the platen overlying the blocker 43.

Blocker elements 43 and 45 can be constructed of any light weight opaque material such as aluminum. The purpose of blocker 43 is to protect an operator from direct flash illumination in situations where the job requirements call for an open platen. The blocker should therefore be of sufficient length and width to completely block a view of the lamp from any point on the platen. The function of blocker 45 is two-fold: to prevent direct light from lamp 42 from entering the lens and for preventing a "hot spot" of intense illumination from forming. The "hot spot", in the absence of the blocker would result from the direct light striking in front of the lens surface by light reflecting downward from the bottom of blocker 43.

From the foregoing, it will be appreciated that integrating cavity 10 is constructed to approximate an integrating sphere and hence is beneficiary to the increase in irradiance which is characteristic of such a construction. The increase is best explained by using, as an example, a point source of radiant energy which is irradiating an elemental surface at some given distance from the source. The irradiation incident upon the surface is of a magnitude $E_o$. If, without changing the intensity of the source of the distance that the elemental surface is positioned from the source, the source is now enclosed within the spherical reflector, a resulting new irradiance, E at the elemental surface is produced. Multiple reflections inside the sphere have greatly increased the irradiance at the elemental surface and a gain factor of E to $E_o$ becomes a function of the average reflectivity of the sphere.

Applying this explanation to cavity 10, it will become apparent that when source 42 is pulsed and caused to flash, light is directed against the cavity walls, and after undergoing multiple reflections from all interior surfaces, produces a near-uniform diffuse illumination at the platen. Significantly, light reflected from the document itself and not directly entering the lens will undergo additional reflections and contribute further to platen irradiance. The illumination system is thus operated at maximum efficiency permitting the use of much smaller, lower energy flash lamps than were heretofore used.

Figure 3:
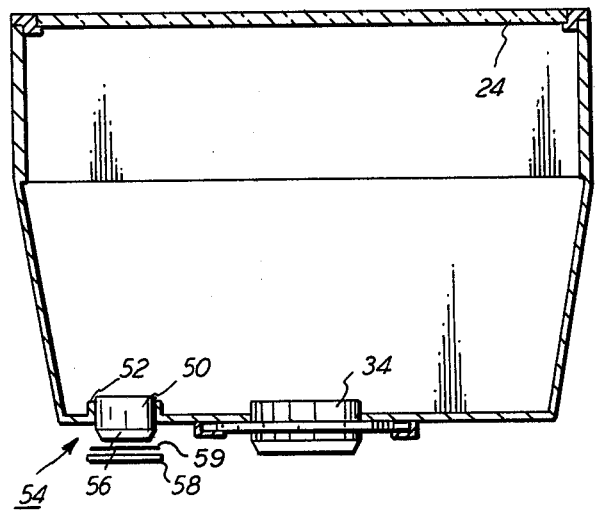
FIG. 3 is a partial sectional view of the illumination housing of FIG. 1, showing one embodiment of the light intensity sensor of the present invention.

As can be seen from FIG. 1, an aperture 50 is provided on the bottom wall 30 of housing 10 to accommodate a housing 52 for a light intensity sensor 54. The construction is more clearly seen in FIG. 3. As shown in FIG. 3, the light intensity sensor 54 may be made of a small lens 56 which focuses the light reflected from the document to be copied onto a photodetector 58. A light filter, 59, may be advantageously used between the small lens 56 and the photodetector 58. The light filter 59 should be selected to match the spectral response of the photoconductor of the document copying machine so that the photodetector will sense the intensity of the useful light.

Figure 4:
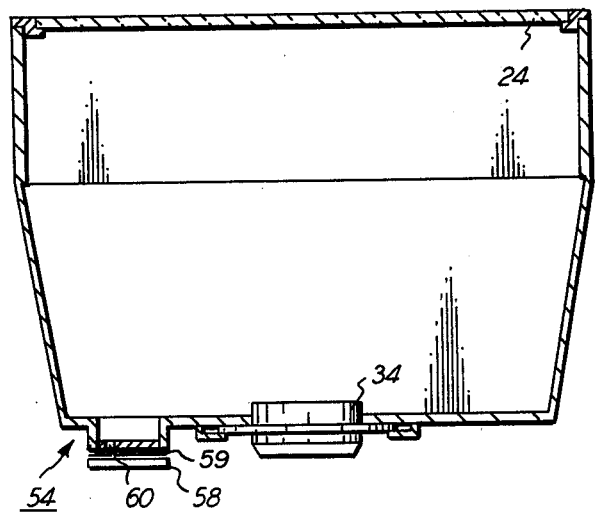
FIG. 4 is a partial sectional view of the illumination housing of FIG. 1, showing another embodiment of the light intensity sensor of the present invention.

In FIG. 4, another embodiment of the light intensity sensor 54 is shown. In this embodiment, an aperture 60 is used to permit only the light reflected from the document to be copied to reach the photodetector 58. As in the embodiment of FIG. 3, a light filter 59 selected to match the spectral response of the photodetector to that of the photoconductor of the document copying machine may be advantageously used between the aperture 60 and the photodetector 58.

Figure 5:
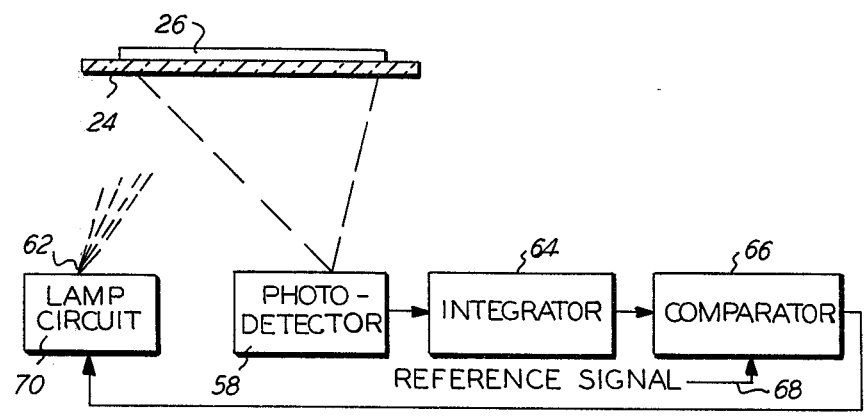
FIG. 5 is a block diagram of the automatic exposure control system of the present invention.

Referring to FIG. 5, an illumination control circuit is shown in block diagram form. As illustrated in FIG. 5, a flash exposure lamp 62 is turned on at the beginning of a copying cycle. Lamp 62 may be turned on by an operator pushing a button (not shown) to make copies. Substantially immediately after lamp 62 is energized, reflected light from the original document 26 is received by the photodetector 58. In accordance with the intensity of the reflected light received, photodetector 58 generates a signal for an integrator 64 which integrates the light output over a period of time to produce a time integral of the light output. A signal proportional to this time integral output energy is then sent by the integrator 64 to a comparator 66. The comparator 66 compares the signal from integrator 64 with a predetermined reference signal 68, which is proportional to a predetermined or desired level of exposure. When the two signals reaching comparator 66 become the same, comparator 66 inactivates lamp circuit 70 to cease further exposure of the original document 26.

It will be appreciated that the signal from integrator 64 is proportional to the total light energy reflected from the original document 26. Thus, the signal from integrator 64 represents an average of the foreground and the background of the original document. When this signal is compared with a reference signal representing the predetermined amount of exposure desired, the signal from integrator 64 represents an average of the background density of original document 26. Such a reading of the background of document 26 is particularly useful when making a copy of a document having a high background level, for example a document on a sheet of colored paper. In such a case, the automatic exposure control system of the present invention will cause increased exposure of the original document thus resulting in the "burnout" of the background. However, an original document may have a high background which is to be copied. An example of such a document may be a photograph of a large gray or shaded area. In such a case, the automatic exposure control system of the present invention would cause the gray or shaded area to be lightened. If such lightening of the original document is not desired in a copy, a manual override button should be provided on the copying machine so that the operator can override the automatic exposure control system to result in a predetermined amount of exposure for the document, without regard to the intensity of the light reflected from the original to the photodetector 58.

While the invention has been described in detail with reference to specific preferred embodiments, it will be appreciated that various modifications may be made by one skilled in the art without departing from the spirit and scope of the invention.

What is claimed is:

1. An automatic exposure control system for a document copying machine comprising:
   a housing having a top surface defining an object plane and containing a platen for supporting a document to be copied, a bottom surface having a first aperture accommodating a lens for focusing an image of a document on a photoconductor image plane, the interior surface of said housing being diffusely reflective to light incident thereon;
   a flash illumination source located within said housing;
   means to pulse said illumination source to produce light flashes which undergo multiple reflections within said housing surfaces to provide a uniformly diffuse irradiation at the platen and
   light intensity sensing means positioned below a second aperture in said bottom surface, so as to image only a portion of the document through said aperture.

2. An automatic exposure control system for a document copying machine comprising:
   a housing having a top surface defining an object plane and containing a platen for supporting a document to be copied, a bottom surface having a first aperture accommodating a lens for focusing an image of a document onto a photoconductive image plane, the interior surface of said housing being diffusely reflective to light incident thereon;
   a flash illumination source located within said housing;
   means to pulse said illumination source to produce light flashes which undergo multiple reflections within said housing surface to provide a uniformly diffuse irradiation at the platen, and
   light intensity sensing means positioned beneath a lens which is accommodated in a second aperture in said bottom surface, said lens focusing an image of a portion of the document onto said sensing means.

3. The exposure control system of claims 1 or 2 further including a light filter placed between said sensing means and said aperture, said light filter being selected to match the spectral response of the photodetector to that of the photoconductive imaging plane.

* * * * *